(12) United States Patent
Thompson et al.

(10) Patent No.: US 7,222,152 B1
(45) Date of Patent: May 22, 2007

(54) GENERIC COMMUNICATIONS FRAMEWORK

(75) Inventors: Donald Thompson, Mercer Island, WA (US); Alan S. Geller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 756 days.

(21) Appl. No.: 09/968,632

(22) Filed: Oct. 1, 2001

(51) Int. Cl.
*G06F 15/16* (2006.01)
*G06F 9/54* (2006.01)

(52) U.S. Cl. ............... 709/202; 709/230; 709/224; 709/225; 705/26; 705/27

(58) Field of Classification Search ........ 709/203–204, 709/217, 227, 249, 219, 202, 230, 245, 250; 370/235, 466; 705/40, 27, 29, 26, 77; 707/100–103; 455/426, 412, 517
See application file for complete search history.

(56) References Cited

U.S. PATENT DOCUMENTS

| | | | |
|---|---|---|---|
| 5,535,322 A | 7/1996 | Hecht | |
| 5,594,889 A | 1/1997 | Colgate et al. | |
| 5,844,980 A | 12/1998 | Patel et al. | |
| 6,202,089 B1 | 3/2001 | Juster | |
| 6,363,363 B1 * | 3/2002 | Haller et al. .................. 705/40 |
| 6,473,794 B1 * | 10/2002 | Guheen et al. ............. 709/223 |
| 6,549,773 B1 * | 4/2003 | Linden et al. ............ 455/426.1 |
| 6,591,277 B2 * | 7/2003 | Spence et al. .......... 707/103 R |
| 6,633,923 B1 * | 10/2003 | Kukura et al. .............. 719/316 |
| 6,771,660 B1 * | 8/2004 | Bourlas et al. ............. 370/466 |
| 6,826,594 B1 * | 11/2004 | Pettersen .................... 709/203 |
| 6,836,888 B1 | 12/2004 | Basu et al. | |
| 7,010,586 B1 | 3/2006 | Allavarpu et al. | |
| 7,065,579 B2 * | 6/2006 | Traversat et al. ........... 709/230 |

OTHER PUBLICATIONS

Van Nieuwpoort et al., "Wide-Area Parrallel Computing in Java," Proceedings of the 1999 ACM Java Grande Conference, 1999, USA, pp. 8-14.
Bal, et al., "Portability in the Orca Shared Object System," Technical Report, Vrije Universiteit, Sep. 1997, Amsterdam, The Netherlands, 14 pages.
Bernstein, "Middleware: A Model for Distributed System Services," Communications of the ACM, vol. 39, No. 2, Feb. 1996, USA, pp. 86-98.

(Continued)

*Primary Examiner*—David Wiley
*Assistant Examiner*—Jude J. Jean-Gilles
(74) *Attorney, Agent, or Firm*—Senniger Powers

(57) ABSTRACT

A system and method for communicating between a client and a server using a generic, extensible, high-speed framework that separates clients and servers from the application layer and transport layer protocols commonly used for network communications. An application (client or server) specifies a uniform resource identifier (URI) to identify an interface for transmitting or receiving one or more messages and to identify the desired protocol and transport for communication. The invention, executing on the client and/or server, instantiates an object based on the URI to implement the specified protocol and transport for communication between the client and the server.

50 Claims, 8 Drawing Sheets

OTHER PUBLICATIONS

Free, "Programming with Communication Protocol Stacks," Dr. Dobbs Journal, vol. 1992, Mar. 1992, USA, 15 pages.

Jing, "Client-Server Computing in Mobile Environments," ACM Computing Surveys, vol. 31, No. 2, Jun. 1999, USA, pp. 117-157.

Hutchinson et al., "Design of the x-Kernel," Symposium Proceedings on Communications Architectures and Protocols, Aug. 1988, USA, pp. 65-75.

Hutchinson et al., "RPC in the x-Kernel; Evaluating New Design Techniques," Proceedings of the Twelfth ACM Symposium on Operating Systems Principles, Dec. 1989, USA, pp. 91-101.

Joseph et al., "Rover: A Toolkit for Mobile Information Access," Proceedings of the Fifteenth ACM Symposium on Operating Systems Principles, Dec. 1995, USA, pp. 156-171.

* cited by examiner

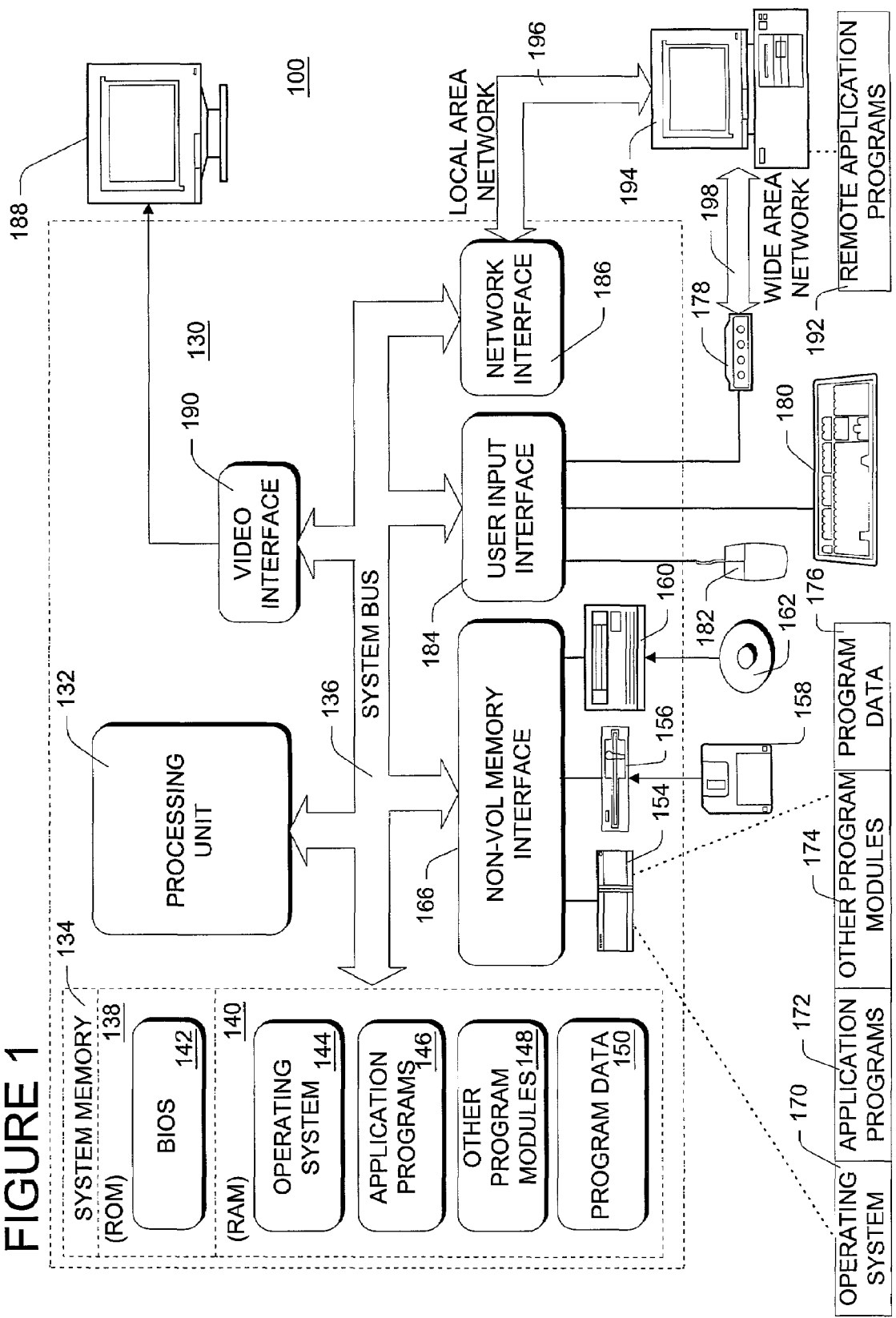

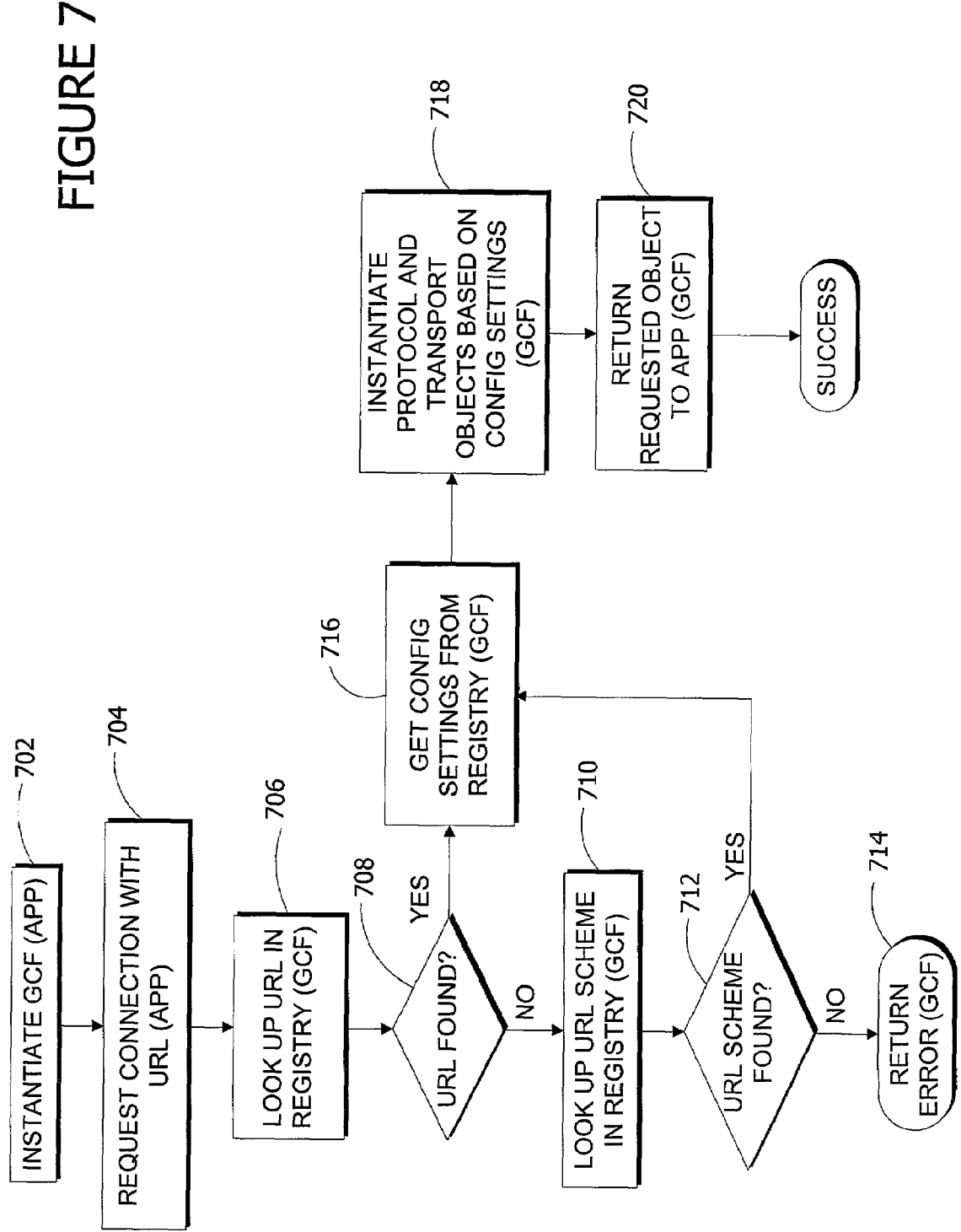

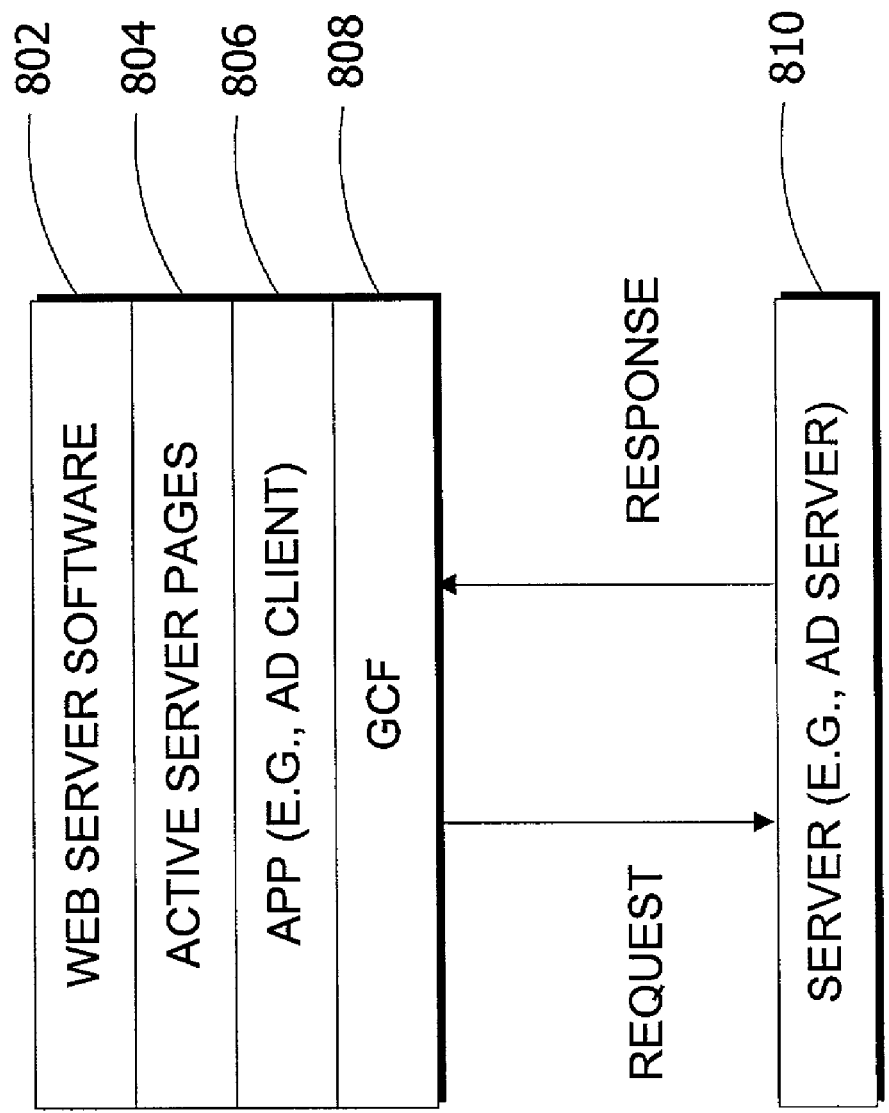

GENERIC COMMUNICATIONS FRAMEWORK

TECHNICAL FIELD

The present invention relates to the field of computer communications. In particular, this invention relates to a system and method for communicating between a client and a server using communications object that supports a plurality of protocols and transports.

BACKGROUND OF THE INVENTION

Some computer systems communicate across networks based on the Internet Protocol (IP) using various protocols such as hypertext transfer protocol (HTTP), file transfer protocol (FTP), and various proprietary protocols. A client application program that wishes to communicate with a server application program across such a network must include software code to handle each of the various protocols used by the application programs for communication.

Some prior art systems provide a library of objects where each object includes software code to support one or more of the various protocols. A software programmer selects the objects from the library that include support for the desired protocol and links the selected objects into the application program during compilation. The software programmer modifies the static application program by re-compiling to add support for other protocols. These prior art systems lack a pluggable framework that can be reused and extended as needed without requiring re-compilation of the application program.

Other prior art systems include software customized to allow two or more application programs to communicate. Such "middleware" is specifically customized to the unique communication requirements of the communicating application programs. The middleware in these prior art systems is static and not re-usable by other application programs with different communication requirements.

For these reasons, a pluggable framework is desired to address one or more of these and other disadvantages.

SUMMARY OF THE INVENTION

The invention includes a system and method for communicating between a client and a server using a generic, extensible, high-speed framework that separates clients and servers from the application layer and transport layer protocols commonly used for network communications. An application (client or server) specifies a uniform resource identifier (URI) to identify an interface for transmitting or receiving one or more messages and to identify the desired protocol and transport for communication. The invention, executing on the client and/or server, instantiates an object based on the URI to implement the specified protocol and transport for communication between the client and the server.

Clients and servers use the invention for robust, protocol-independent network applications in which the invention establishes socket connections, listens over ports, and performs similar low-level communication details using a Generic Communications Framework (GCF). The invention is protocol agnostic and manages all connections for clients and servers. The invention supports different standard protocols so that applications according to the invention can communicate with any protocol-conformant client or server.

The invention allows applications (clients and servers) to be written quickly and easily by abstracting them away from the underlying protocols and transports. Clients and servers that use the invention can switch between different protocols by changing configuration settings.

The invention reduces application complexity through abstraction. The invention also reduces application development time by not writing redundant code, resulting in fewer bugs. The invention further allows software programmers to focus on a single software code base allowing the code base to be optimized.

In accordance with one aspect of the invention, a method allows communication between a client and a server in a distributed processing system. The client executes a client application and the server executes a server application. The method includes creating a communications object that supports a plurality of protocols enabling communication between the client and the server. The method also includes passing a uniform resource identifier (URI) from the client application to the communications object. The URI identifies the server application with which the client application desires to communicate. The method also includes instantiating the communications object based on the URI. The instantiated communications object specifies a desired application layer protocol. The application layer protocol is one of the protocols supported by the communications object. The method also includes implementing, by the instantiated communications object, the application layer protocol to establish a connection between the client application and the server application.

In accordance with another aspect of the invention, one or more computer-readable media have computer-executable components including a client application component, a server application component, and a communications object component. The client application component desires to communicate with the server application component. The communications object component supports a plurality of protocols enabling communication between the client and server application components. The communications object component is instantiated based on a URI identifying the server application component. The instantiated communications object component specifies a desired application layer protocol. The application layer protocol is one of the protocols supported by the communications object component. The instantiated communications object component implements the application layer protocol to establish a connection between the client application component and the server application component.

A distributed processing system embodying aspects of the invention includes a client executing a client application, a server executing a server application with which the client application desires to communicate, and a computer-readable medium. The computer-readable medium has computer-executable instructions for implementing a communications object. The communications object supports a plurality of protocols to enable communication between the client and server applications. The communications object is instantiated based on a URI identifying the server application. The instantiated communications object component specifies a desired application layer protocol. The application layer protocol is one of the protocols supported by the communications object. The instantiated communications object implements the application layer protocol to establish a connection between the client application and the server application.

In another embodiment, a method allows communication between a first device and a second device via a communication component. The first device executes an application program. The method includes conveying, from the application program to a communication component associated with the first device, a URI for specifying a protocol and transport. The method also includes receiving, by the application program from the communication component, identification of a transmitting interface. The transmitting interface transmits, by the application program to the second device, at least one message. The transmitting interface implements the specified protocol and transport to transmit the message from the application program to the second device.

In accordance with yet another aspect of the invention, a method allows communication between a first device and a second device via a communication component. The first device executes an application program. The method includes conveying, from the application program to a communication component associated with the first device, a uniform resource identifier (URI) for specifying a protocol and transport. The method also includes identifying, by the application program to the communication component, a receiving interface. The receiving interface receives, by the application program from the communication component, at least one message. The communication component implements the specified protocol and transport to receive the message from the second device for processing by the first device.

Another embodiment of the invention is directed to a method that allows communication between a first device and a second device via a communication component associated with the first device. The method includes receiving, by the communication component from an application program executing on the first device, a URI for specifying a protocol and transport. The method also includes instantiating an object based on the URI. The object is accessible by the application program for implementing the specified protocol and transport to transmit at least one message from the first device to the second device. The method also includes receiving, by the communication component from the application program, identification of a receiving interface. The receiving interface receives, by the application program from the communication component, a second message in response to the first message. The application program processes the second message.

Alternatively, the invention may comprise various other methods and apparatuses.

Other features will be in part apparent and in part pointed out hereinafter.

BRIEF DESCRIPTION OF THE DRAWINGS

FIG. 1 is a block diagram of one embodiment of the method and system of the invention illustrating an example of a suitable computing system environment on which the invention may be implemented.

FIG. 7 is a flow chart of one embodiment of the invention illustrating operation of a GCF client.

FIG. 8 is a block diagram of one embodiment of the invention illustrating an electronic advertisement client application interacting with a electronic advertisement server.

Corresponding reference characters indicate corresponding parts throughout the drawings.

DETAILED DESCRIPTION OF THE INVENTION

Figure 2A:
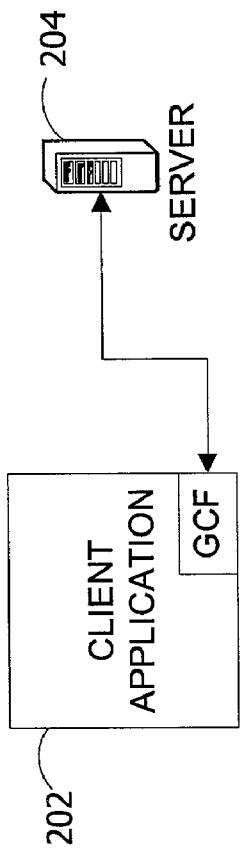
FIG. 2A is a block diagram of one embodiment of the invention illustrating communication between a client application with a GCF client and a server.

The invention relates to a system and method of communicating between a client and a server in a distributed processing system. The invention implements high-performance client/server communications patterns using arbitrary protocols and transports. For example, a client according to the invention can exchange data with various Web servers or browsers using a hypertext transfer protocol (HTTP) or a file transfer protocol (FTP). In one embodiment, the invention is a component developed in C++ according to a component object model (COM).

The client executes a client application and the server executes a server application. The invention includes a generic communications framework (GCF) or other communications object or component. The communications object supports a plurality of protocols enabling communication between the client and the server. The invention supports a client/server communications model in which clients and servers are addressable via a uniform resource locator (URL) or other uniform resource identifier (URI). The client application passes a URI from the client application to the communications object. The URI identifies the server application with which the client application desires to communicate. A communications object is instantiated based on the URI. The instantiated communications object specifies a desired application layer protocol. The communications object implements the application layer protocol to establish a connection between the client application and the server application. The GCF object is an instantiated communications object or component.

The invention provides a flexible and efficient way of shuttling application data across arbitrary transports using arbitrary protocols. Application coding is minimized due to the completeness of the implementation, making it easy to quickly construct new clients and servers that are capable of taking advantage of features such as I/O completion ports (on transports that support them) and multiplexed/demultiplexed (MUX/DEMUX) transmissions (using protocols that support such a feature). These elements will work together to move the data between client and server transparently to the application. Both elements can be "plugged in" to the system and mixed-and-matched arbitrarily.

Both clients and servers specify protocol and host information in standard URI format. Monikers representing custom protocols will be used in place of standard protocols (i.e., HTTP). The meaning of the host information depends on the context. For example, the host information for HTTP will be the name (or IP address) of the remote server or network interface card to listen on. The URI that a client application uses to create a client communications object depends on the type of requests the client application needs to make. For instance, if a client application needs to contact an HTTP server, the URI must specify that protocol.

Some protocols are inherently serial and cannot be MUX/DEMUXed (i.e., HTTP). Limits can be placed (via configuration) on the number of connections to create on a per protocol basis (both globally and per destination). Multiple connections to the same URI on serialized protocols allow them to transact in parallel. Non-serialized connections place no limits on the number of clients that may concurrently have access.

The invention is generally asynchronous and requests made to the communications component will complete immediately. The application is notified using event sinks in the form of callback interfaces that the application must implement.

Clients and servers that use the invention can switch between different protocols by changing configuration settings. In one embodiment, the invention is a thin layer over different application and transport protocols such as HTTP, FTP, and TCP/IP. When a client application wants to contact a listening server application, the client application interacts with the client communications component that implements the desired application layer protocol over the desired transport layer. Data travels up a similar hierarchy to communicate with the server-side application.

Referring first to FIG. 1, a block diagram illustrates one example of a suitable computing system environment 100 on which the invention may be implemented. The computing system environment 100 is only one example of a suitable computing or operating environment and is not intended to suggest any limitation as to the scope of use or functionality of the invention. Neither should the computing system environment 100 be interpreted as having any dependency or requirement relating to any one or combination of components illustrated in the exemplary computing system environment 100.

FIG. 1 shows one example of a general purpose computing device in the form of a computer 130. In a preferred embodiment of the invention, a computer such as the computer 130 is suitable for use in the other figures illustrated and described herein.

Computer 130 preferably has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 preferably includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 1 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 144, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 1, provide storage of computer readable instructions, data structures, program modules and other data for the computer 130. In FIG. 1, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a universal serial bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 1 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 194, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Figure 2B:
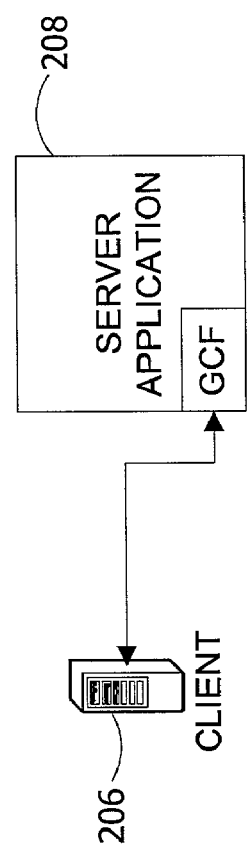
FIG. 2B is a block diagram of one embodiment of the invention illustrating communication between a server application with a GCF server and a client.
Figure 2C:
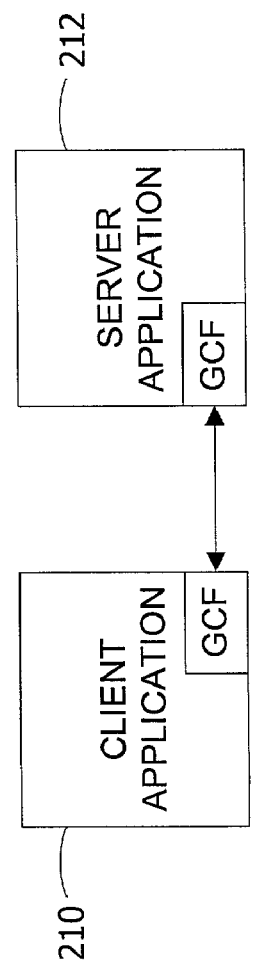
FIG. 2C is a block diagram of one embodiment of the invention illustrating communication between a client application with a GCF client and a server application with a GCF server.

Referring next to FIGS. 2A-2C, a block diagram illustrates the various types of communication between clients and servers using a GCF communications object. FIG. 2A illustrates communication between a client application 202 with a GCF client and a server 204. In this embodiment, the server 204 does not have a GCF object. FIG. 2B illustrates communication between a client 206 and a server application 208 with a GCF server. In this embodiment, the client 206 does not have a GCF object. FIG. 2C illustrates communication between a client application 210 with a GCF client and a server application 212 with a GCF server. According to the invention, the communications object establishes a single connection between the client application 210 and the server application 212 and multiplexes and demultiplexes requests from the client application 210.

Figure 3:
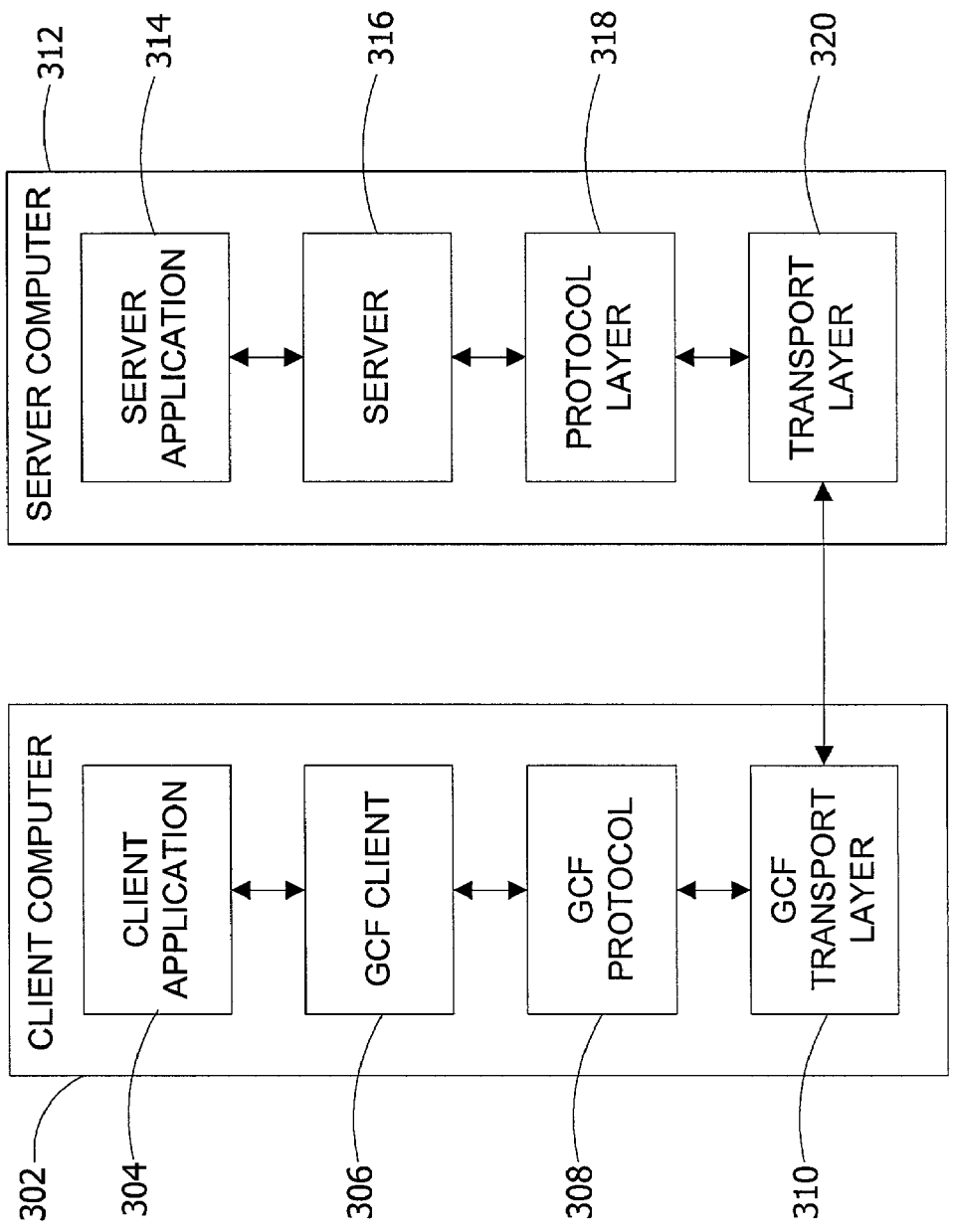
FIG. 3 is a block diagram of one embodiment of the invention illustrating the flow of data between the various layers of a client computer and a server computer.

Referring next to FIG. 3, a block diagram illustrates the exemplary flow of data between the various layers of a client computer with a GCF object and a server computer. A client computer 302 with a client application 304 communicates with a GCF client 306. The GCF client 306 implements a protocol and a transport via a GCF protocol 308 and a GCF transport layer 310, respectively, to communicate with a server computer 312. Communication between the client 302 and the server 312 is enabled according to a protocol stack having at least an application layer protocol (e.g., HTTP) and a transport layer protocol. The communication object 306 separates at least one of the client applications 304 from the application layer 308 and transport layer 310 protocols. In an embodiment in which the server 312 includes a GCF object, the GCF object of the server application separates at least one of the server applications from the application layer and transport layer protocols. The instantiated GCF communications object 306 specifies a desired transport layer protocol 310. The instantiated communications object implements an application layer protocol 308 (e.g., HTTP) over the transport layer protocol 310. The server computer 312 includes a server application 314 communicating with a server 316. The server 316 implements a protocol and transport via a protocol layer 318 and a transport layer 320, respectively, to communicate with the client computer 302.

Figure 4:
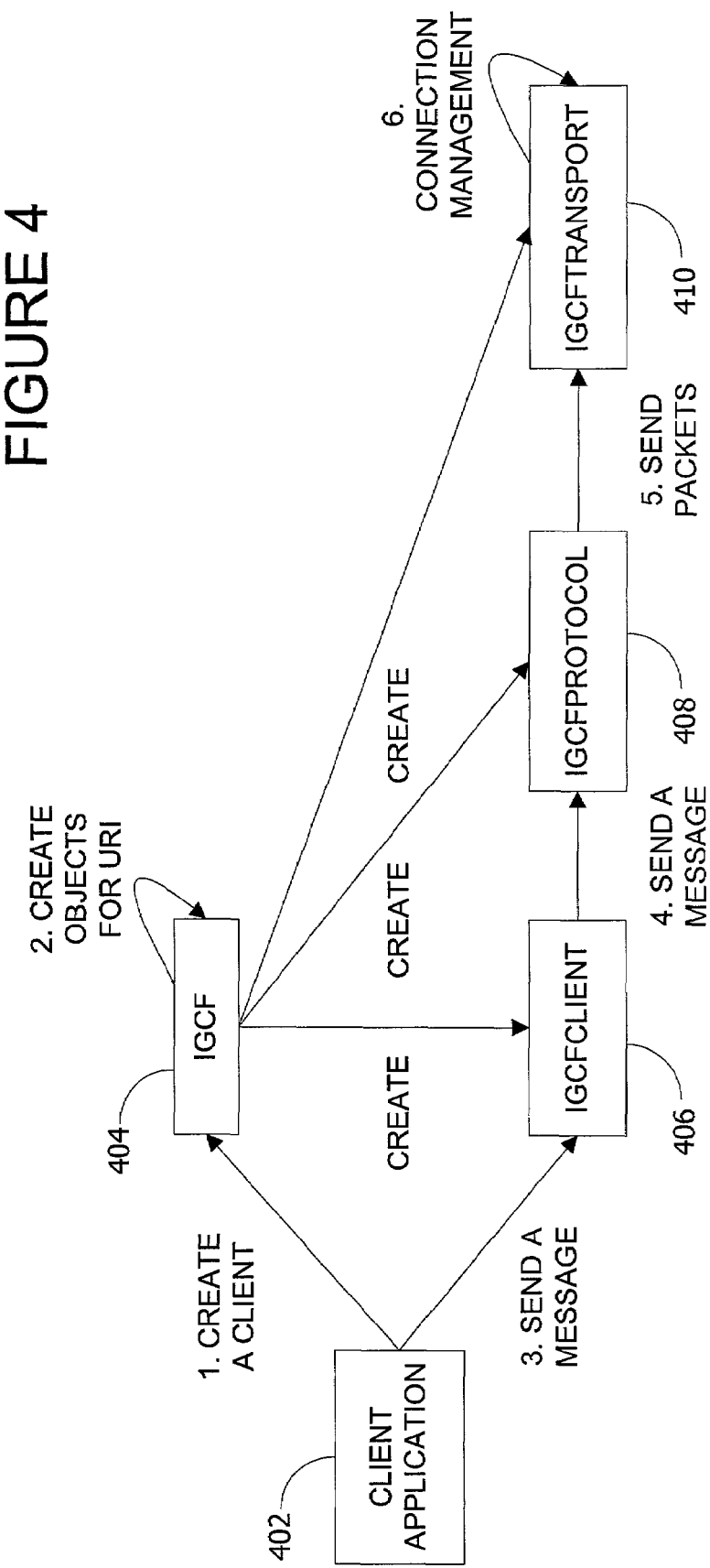
FIG. 4 is a block diagram of one embodiment of the invention illustrating the process for implementing a GCF client.

Referring next to FIG. 4, a block diagram illustrates the process for implementing a GCF client. In one embodiment, a client computer or other client is part of a distributed processing system. The client computer executes a client application 402. A communications object (IGCF) 404 is created (e.g., by a software programmer) to support a plurality of protocols enabling communication between the client and a server. The IGCF 404 is protocol agnostic. The client application 402 passes a uniform resource identifier (URI) to the IGCF 404 to identify a server application executed by the server with which the client application wishes to communicate. The client application 402 uses the IGCF 404 to instantiate a specific communications object (IGCFClient) 406 based on the URI. The IGCFClient 406 specifies a desired application layer protocol that is one of the protocols supported by the IGCF 404. The IGCFClient 406 implements the application layer protocol via an IGCFProtocol object 408 and an IGCFTransport object 410 to establish a connection between the client application 402 and the server. In one embodiment, the client application 402 instantiates the IGCF 404 based on a different URI identifying another server application with which the client application 402 desires to communicate.

The IGCF 404 includes IGCFClient 406 for use by the client application 402 to send one or more requests to the server application. The client application 402 sends messages to the IGCFClient 406 that are transmitted to the server via packets sent by the IGCFProtocol 408 and IGCFTransport 410 objects. The IGCFTransport object 410 manages connections with the server. A request from the client application 402 includes, but is not limited to, one of the following types of requests: a notification, a transaction, or a query. A notification is a one-way communication from the client to the server. The notification is a unidirectional transmission that is not guaranteed to be delivered and may have a size restriction (depending on the transport). A client application 402 uses a notification to send requests when a response or acknowledgement is not needed. A transaction is a two-way communication in which a client sends data to the server for processing. The server returns either the processed data or additional data back to the client. Clients expect a response to all transactions. The transaction is a bidirectional transmission that is guaranteed to be delivered and does not have a size restriction. A query is a two-way communication. The query is similar to the transaction in that the query is essentially a qualified transaction. If the client needs information from the server, the client queries for this information and passes attributes to the server that qualify the required information. For example, the client could request an active server page (ASP) from the server and include attributes such as tag/value parameters in the request.

One or more computer-readable media have computer-executable instructions to perform the method illustrated in FIG. 4.

Figure 5:
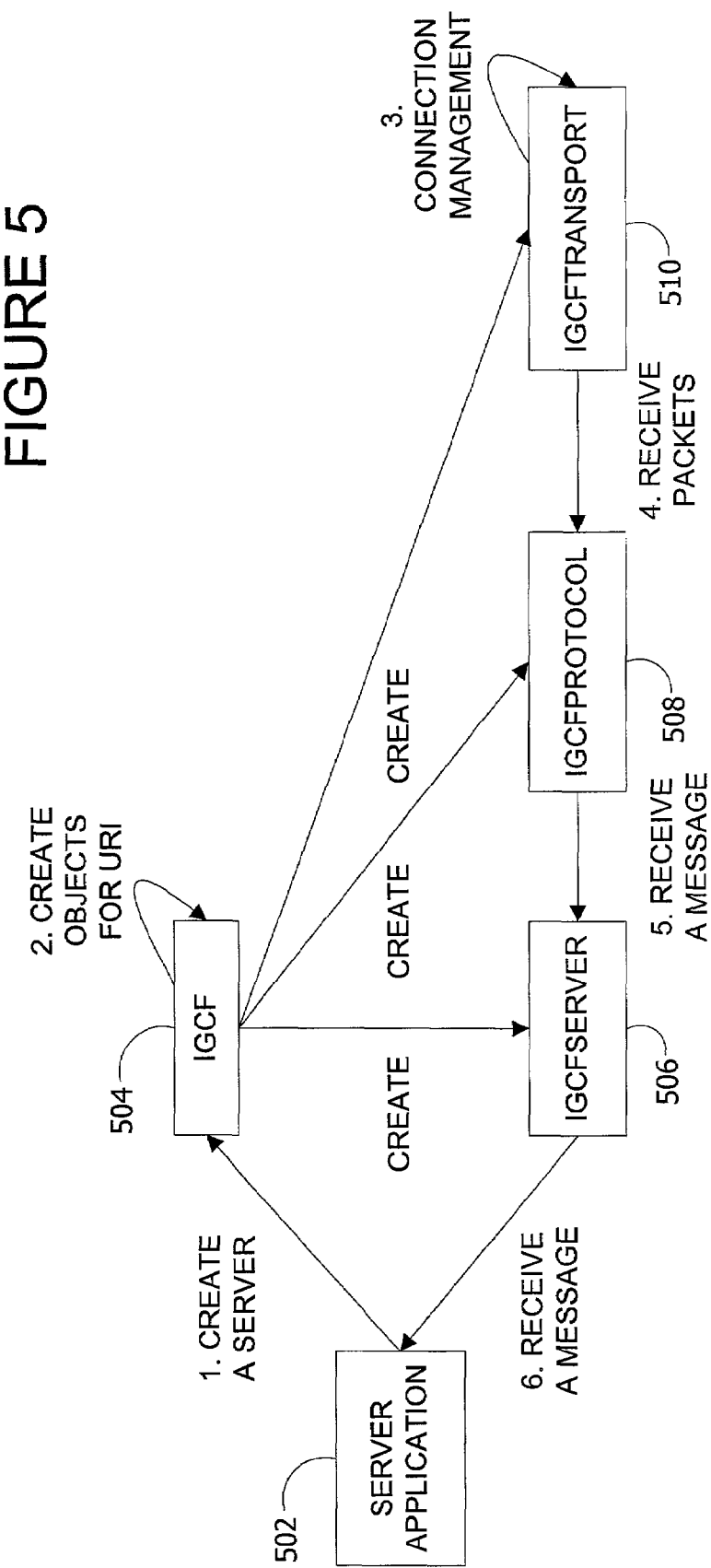
FIG. 5 is a block diagram of one embodiment of the invention illustrating the process for implementing a GCF server.

Referring next to FIG. 5, a block diagram illustrates the process for implementing a GCF server. In one embodiment, a server computer is part of a distributed processing system and executes a server application 502. A software programmer creates a communications object (IGCF) 504 that supports a plurality of protocols enabling communication between a client and the server. The IGCF 504 is protocol agnostic. The server application 502 passes a URI to the IGCF 504 to identify the server application 502. The server application 502 uses the IGCF 504 to instantiate a specific communications object (IGCFServer) 506 based on the URI. The IGCFServer object 506 specifies a desired application layer protocol that is one of the protocols supported by the IGCF 504. The IGCFServer object 506 implements the application layer protocol via an IGCFProtocol object 508 and an IGCFTransport object 510 to establish a connection between the server application 502 and a client application executed by the client. In one embodiment, the server application 502 instantiates the IGCF 504 based on a different URI identifying another client application with which the server application 502 desires to communicate.

The IGCF 504 includes the IGCFServer object 506 for use by the server application 502 to receive one or more requests or other messages sent by the client. The server application 502 receives messages from the IGCFServer object 506. The IGCFServer object 506 communicates with the client via packets received by the IGCFProtocol 508 and IGCFTransport 510 objects. The IGCFTransport object 510 manages connections with the client. For some requests received from the client, the server application 502 generates one or more replies. To send a reply to the client, the server application 502 uses the IGCFServer 506 to send the replies to the client.

Figure 6:
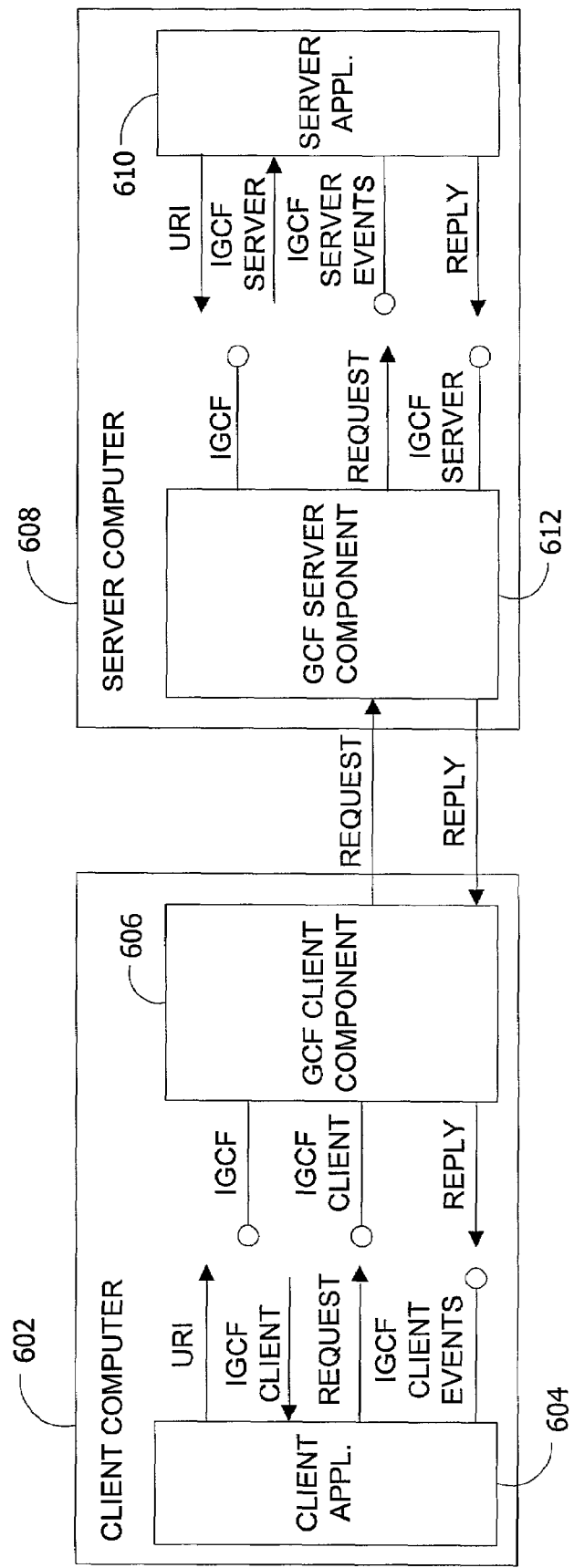
FIG. 6 is a block diagram of one embodiment of the invention illustrating the flow of data through the interfaces exposed and implemented by a GCF client and a GCF server.

Referring next to FIG. 6, a block diagram illustrates the exemplary flow of data through the interfaces exposed and implemented by a GCF client and a GCF server. A client computer 602 has a client application 604 communicating with a GCF client component 606. In this embodiment, a server computer 608 has a server application 610 communicating with a GCF server component 612. In turn, the GCF client component 606 sends one or more requests to the GCF server component 612. The GCF server component 612 sends one or more replies to the GCF client component 606.

The GCF exposes several public interfaces. Appendix A includes a programming reference for the public GCF interfaces implemented as COM objects. A GCF component (IGCF) creates all other interfaces. FIG. 6 depicts the public interfaces exposed by the GCF, plus those implemented by client applications such as client application 604 and servers, and the flow of data through those interfaces. The GCF works on an asynchronous model by sending requests or responses. The clients and servers send data and continue other processing until they receive requests or responses. To receive requests and replies, the server applications and client applications must implement the appropriate callback interface, either IGCFServerEvents or IGCFClientEvents, respectively (see below).

The process for implementing a GCF client component 606 is next described. For the client application 604 to send a request to a listening server application 610, the client application 604 creates the GCF client component 606 and queries the GCF client component 606 for an IGCF interface. In one embodiment, the client application 604 uses standard component object model (COM) methods to create the GCF component. An initialize method on the IGCF interface initializes the GCF client component 606. The client application 604 passes the URI of the desired server application 610 to the GCF client component 606 via the IGCF interface. The GCF client component 606 then returns a pointer to the IGCFClient interface. The client application 604 uses the IGCFClient interface to send one or more requests to the server application 610. In one embodiment, the requests include one or more of the following: a notification, a transaction, and a query. The requests are encapsulated with data such as headers and trailers according to a protocol and transport identified by the URI. The IGCFClient interface of the GCF client component 606 establishes a connection with the server computer 608 to send the encapsulated requests to the GCF server component 612. When the GCF client component 606 successfully sends a request to the server, the GCF client component 606 raises an OnSend notification to the client application 604.

The client application 604 also passes a pointer to an IGCFClientEvents callback interface to the GCF client component 606. The client application 604 uses the IGCFClientEvents interface to receive messages such as replies from the GCF client component 606. When the GCF client component 606 receives a reply from the server application 610, the GCF client component 606 notifies the client application 604 by raising an event designated OnRecv and passing in the data received from the server to the client application 604 via the IGCFClientEvents interface. The IGCFClientEvents interface implements asynchronous events generated by the GCF client component 606.

The GCF client component 606 also supports client time-outs. If a GCF client component 606 does not receive a reply from a server within a specified time, the GCF client component 606 times out and sends a null response or other error message to the client application 604. Users and developers can configure the time-outs in various ways including, but not limited to, configuring the duration of time prior to sending an error message to the client application 604.

The process for implementing a GCF server is next described. The process for implementing a GCF server resembles the process for implementing a GCF client. The server application 610 creates and initializes the GCF server component 612 and receives identification of an IGCF interface from the GCF server component 612. The server application 610 then passes the URI on which the server application 610 will listen to the GCF server component 612 via the IGCF interface. The GCF server component 612 then returns a pointer to the IGCFServer interface. The server application 610 uses the IGCFServer interface to receive one or more request from the client and to send one or more replies to the client. The server application 610 also uses the IGCFServer interface to call a StartListening method and listen for any clients that want to connect. When the server application 610 no longer wants to accept connections from any client, it calls a StopListening method and communication ends.

The server application 610 passes a pointer to an IGCFServerEvents callback interface to the GCF server component 612. When the GCF server component 612 receives a request from a client, the GCF server component 612 uses the IGCFServerEvents interface to notify the server application 610 of the request. The server application 610 processes the request, and then uses the IGCFServer interface to send the reply to the client. The IGCFServerEvents interface implements asynchronous events generated by the GCF server component 612. In one embodiment, the server application 610 uses the IGCFServerEvents callback interface to send a reply to a request received from the client application 604. In one embodiment, either or both of the GCF client and GCF server component 612 are component object model (COM) components.

Referring next to FIG. 7, an exemplary flow chart illustrates operation of a GCF client according to one embodiment of the invention. An application program instantiates a GCF component at 702. The application program requests at 704 a connection by specifying a URL. The GCF component then looks up the URL in a registry at 706. If the URL is not found in the registry at 708, the GCF component proceeds to 710. At 710, the GCF component looks up at 710 a scheme associated with the URL in the registry. If the URL scheme is not found at 712, an error to the application program is returned at 714. If the URL or URL scheme is found in the registry at 708, the GCF component retrieves configuration settings from the registry at 716. The GCF component instantiates protocol and transport objects based on the retrieved configuration settings at 718. The GCF component returns at 720 the requested object to the application program.

Referring next to FIG. 8, a block diagram illustrates an electronic advertisement client application interacting with a electronic advertisement server. Web server software 802 has access to Web pages such as active server pages (ASP) 804. A client application 806 such as an advertisement client application uses a GCF component 808 to send requests to a server 810 such as an advertisement server. The advertisement server 810 stores, for example, content associated with the advertisements. The advertisement server 810 sends one or more responses to the client application.

In one embodiment, users can configure several operational parameters for protocols, transports, and hosts by manually changing values in the registry. In one embodiment, a configuration tool simplifies the process. Some of the configuration parameters for protocols use hints or other values for frequently used sizes of data structures. The GCF uses hints for efficiency purposes, to pool, or recycle frequently used data structures. However, hints do not prevent applications from sending sizes greater or smaller than the values specified in the configuration settings.

As an example, the following registry key contains default values for the protocols: HKEY_LOCAL_MACHINE\SOFTWARE\AdDelivery\ GCF\Protocols.

In this embodiment, the following values can be configured for a protocol. A ProgId specifies the program ID of the desired protocol. A Timeout represents a value in milliseconds that elapses before a request times out. A negative 1 (−1) disables the timeouts. A ReceiveBufferHint represents the size in bytes of data typically received by a server. A BufferArrayHint represents the number of SGCFBuffers an application typically sends to GCF. A Transport represents the configuration tree for the transport layer. In one embodiment, the following registry key contains the default values for the transport layers:

HKEY_LOCAL_MACHINE\SOFTWARE\AdDelivery\ GCF\Transports

The following values can be configured for a transport layer. A ProgId represents the program ID of the desired transport. A ReceiveBufferSize represents a typical size of the buffers that receive requests. An OutstandingReceives represents the number of requests in a queue awaiting replies. A ConnectionRetryDelay represents the amount of time that elapses before a client tries to reconnect to a server.

The application layer protocol implements a hypertext transfer protocol (HTTP) or a generic communications framework protocol (GCFP) in one embodiment of the invention. The transport layer implements a transmission control protocol/Internet protocol (TCP/IP) transport or a universal data protocol (UDP) transport. GCFP is a proprietary, packed binary format used for internal data flows. The invention also supports a file transfer protocol (FTP). The invention supports transports such as transmission control protocol (TCP) and universal data protocol (UDP). For example, a URL of http://www.msn.com:80 will cause the GCF component to create a protocol object (IGCFProtocol) to handle HTTP across a TCP transport (IGCFTransport), in the default configuration. In another example, to post data to a page called "databucket.asp" located at www.adtech.com, the client application passes http://www.adtech.com/databucket.asp in the call to create the GCF client object. The GCF internally parses and caches the resource from the URL for use in any GCF "transactions" made to the page. The GCF component supports the HTTP "drizzle" feature to enable background downloads. To use a proprietary protocol such as GCFP, the URL might be specified as gcfp://127.24.122.52:8000.

A GCF component need not communicate with another GCF component. For instance, a GCF client can communicate with Web server software and a GCF server can accept requests from a Web browser using the HTTP protocol. Similarly, the client can be a computer and the server can be a hardware device. The server can also be a computer-readable medium. The client can be a hardware device and the server can be a computer. The invention supports any custom or third-party protocol and/or transport as long as the GCF public interface (see below) is supported. The invention can be used to communicate with any computer hardware or software including, but not limited to, a network, a computer-readable medium, any peripheral hardware device, and an application program. The computer-readable media are associated with either or both of the client and server computers. The invention is implemented as a COM object in C++. Any aspect of the invention is implemented in hardware and/or software. Client and server applications can send arrays of buffers to the GCF for transmission. With these buffers, the memory to which the buffers point—the data a client or server sends—must persist until the client and server applications receive a notification (e.g., OnSend) or confirmation from the GCF.

Further, the invention is not limited to any specific reference model that separates computer-to-computer communications into protocol layers. The invention can be implemented according to any reference model that implements functionality similar to the functionality described herein. For example, a communications component as described herein includes functionality for program-to-program transfer of information and functionality for accurate delivery of information and service quality.

The invention may also include functionality for shutting down GCF clients and servers. When a client application finishes using a GCF client, it calls the Shutdown method on the IGCFClient interface. When the client application finishes using the GCF as whole, it calls the Shutdown method on the IGCF interface. Similarly, when a server application finishes using a GCF server, the server application stops listening for further connection attempts by calling the StopListening method. The server application then shuts down the GCF server by calling the Shutdown method on the IGCFServer interface. When the server application finishes with the GCF as a whole, the server application calls the Shutdown method on the IGCF interface.

Similarly, after a client application creates a GCF client object it should maintain the object until the client application no longer intends to communicate with the server application. Generally, a client application does not need to create and destroy GCF objects more than once per session.

The GCF uses a feature such as the "boxcar" feature in HTTP version 1.1 to multiplex/demultiplex (mux/demux) requests and increase communication speeds. The GCF establishes a single connection between a client and server application. Any thread from a client application can then submit requests to a GCF client object at any time. As the client object sends data the server object accumulates the data in its kernel and passes it up to the GCF, which breaks them apart in the order received and processes them. Under this model, client and server applications establish and manage one connection, and they receive large numbers of requests over that connection. As a result, they spend nearly 100 percent of their resources processing data instead of transitioning to and from kernel mode and managing socket overhead.

For example, in the electronic advertisement delivery embodiment, there may be hundreds of threads executing on a client and communicating with a remote server storing the advertisements. All the threads use the same GCF object (with established connections) to communicate with the remote server. The GCF object can combine from multiple threads onto one connections, and demultiplex the responses to the requests after they are received by the GCF object. The multiplex/demultiplex capability works across multiple protocols. The GCF object can implement multiplexing and demultiplexing differently for each protocol. For example, demultiplexing may occur on a first-in first-out (FIFO) basis or according to embedded state information in each received packet.

A multi-homed computer includes more than one network interface card and can connect to more than one LAN. To use the invention with multi-homed machines, the URIs used to create GCF clients and servers should include the IP address of the network card connected to the desired LAN, not the machine name.

For example, http://192.168.13.21/DataBucket.asp would serve as a proper URL for a multi-homed machine, but http://AdTech/DataBucket.asp may route the request to the wrong destination. Machine names resolve to specific interface cards, so passing machine names could route the request to a card connected to the wrong LAN.

If the client and server applications execute on multiprocessor machines, the invention uses thread affinity to reduce CPU load. In one embodiment, the GCF transports operate under an input/output completions model. If interrupts raised by the network interface cards on the servers are bound to a single CPU, the threads started by the GCF can also be bound to the interrupts. Thread binding reduces the load on the server's CPUs by confining requests and replies to a single CPU. Further, in a multi-threaded application, the invention supports re-entrant multithreading. As such, implementing locking around any GCF code or critical sections is not necessary.

In one embodiment, one or more computer-readable media have computer-executable components for operation of the invention. The components include a client application component, a server application component, and a communications object component. The client component desires to communicate with the server application component. In one embodiment, the client application component and the server application component are located on separate computer-readable media. The communications object component supports a plurality of protocols enabling communication between the client and server application components. The communications object component is instantiated based on the URI identifying the server application component. The instantiated communications object component (IGCFClient or IGCFServer) specifies a desired application layer protocol. The application layer protocol is one of the protocols supported by the communications object component. The instantiated communications object component implements the application layer protocol to establish a connection between the client application component and the server application component.

In another embodiment, a distributed processing system includes a client executing a client application and a server executing a server application. The client application desires to communicate with the server application. The distributed processing system also includes a computer-readable medium having computer-executable instructions for implementing a communications object. The communications object supports a plurality of protocols to enable communication between the client and server applications. The communications object is instantiated based on the URI identifying the server application. The instantiated communications object component (IGCFClient or IGCFServer) specifies a desired application layer protocol. The application layer protocol is one of the protocols supported by the communications object. The instantiated communications object implements the application layer protocol to establish a connection between the client application and the server application. The instantiated communications object specifies a desired transport layer protocol and implements the application layer over the transport layer protocol.

The invention includes a method of communicating between a first device and a second device via a communication component. The first device executes an application program. The method includes conveying from the application program to a communications component associated with the first device the URI. The URI specifies a protocol and transport. The application program receives from the communication component identification of a transmitting interface (e.g., IGCFClient). The transmitting interface transmits to the second device at least one message. The transmitting interface implements the specified protocol and transport to transmit the message from the application program to the second device. In one embodiment, the message is a request message. The application program identifies to the communication component a receiving interface (e.g., IGCFClientEvents) for receiving, by the application program from the communication component (IGCF), at least one reply message in response to the request message. The application program processes the reply message.

The invention also includes a method of communicating between a first device and a second device via a communication component. The first device executes an application program. The method includes the application program conveying to a communication component associated with the first device the URI. The URI specifies a protocol and transport. The application program identifies to the communication component a receiving interface (e.g., IGCFServerEvents) for receiving from the communication component at least one message. The communication component implements the specified protocol and transport to receive the message from the second device for processing by the first device. In one embodiment, the message is a request message. The application program receives from the communication component identification of a transmitting interface (e.g., IGCFServer) for transmitting to the second device at least one reply message in response to the request message. The second device processes the reply message.

The invention also includes a method for communicating between a first device and a second device via a communication component associated with the first device. The communication component receives from an application program executing on the first device the URI. The URI specifies a protocol and transport. The communications component instantiates an object based on the URI. The object is accessible by the application program for implementing the specified protocol and transport to transmit at least one message from the first device to the second device. The communications component receives from the application program identification of a receiving interface (e.g., IGCFServerEvents or IGCFClientEvents) for receiving from the communication component a second message in response to the first message. The application program processes the second message.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of communicating between a client and a server in a distributed processing system, said client executing a client application and said server executing a server application, said method comprising:

creating a first communications object that supports a plurality of protocols enabling communication between the client and the server, said first communications object being protocol agnostic;

passing a uniform resource identifier (URI) from the client application to the first communications object, said URI identifying the server application with which the client application desires to communicate;

identifying a desired application layer protocol based on the URI from the client application, said desired application layer protocol being one of the plurality of protocols supported by the first communications object;

instantiating a second communications object based on the URI, said second communications object being protocol specific and corresponding to the identified application layer protocol, said second communications object specifying a desired transport layer protocol; and implementing, by the instantiated second communications object, the application layer protocol to establish a connection between the client application and the server application, said instantiated second communications object implementing the application layer over the transport layer protocol.

2. The method of claim 1, wherein communication between the client and server is enabled according to a protocol stack having at least the application layer protocol and the transport layer protocol and wherein the first communications object separates at least one of the client and server applications from the application layer and transport layer protocols.

3. The method of claim 1, further comprising creating a callback interface from the instantiated second communications object and implementing, by one or both of the client and server applications, asynchronous events generated by the instantiated second communications object.

4. The method of claim 3, wherein the server application uses the callback interface to send a reply to a request received from the client application.

5. A method of communicating between a client and a server in a distributed processing system, said client executing a client application and said server executing a server application, said method comprising:

creating a first communications object that supports a plurality of protocols enabling communication between the client and the server, said first communications object being protocol agnostic;

passing a uniform resource identifier (URI) from the client application to the first communications object, said URI identifying the server application with which the client application desires to communicate;

identifying a desired application layer protocol based on the URI from the client application, said desired application layer protocol being one of the plurality of protocols supported by the first communications object;

instantiating a second communications object based on the URI, said second communications object being protocol specific and corresponding to the identified application layer protocol, wherein said second communications object specifying a desired transport layer protocol, wherein the instantiated second communications object comprises a client object for use by the client application, said client application using the client object to send one or more requests to the server application; and implementing, by the instantiated second communications object, the application layer protocol to establish a connection between the client application and the server application, said instantiated second communications object implementing the application layer over the transport layer protocol.

6. The method of claim 5, wherein the request from the client application is one or more of the following: notification, transaction, and query.

7. The method of claim 1, wherein the instantiated second communications object comprises a server object for use by the server application, said server application using the server object to receive one or more requests sent by the client application.

8. The method of claim 1, wherein the second communications object establishes a single connection between the client application and the server application and further comprising multiplexing/demultiplexing requests from the client application.

9. A method of communicating between a client and a server in a distributed processing system, said client executing a client application and said server executing a server application, said method comprising:

creating a first communications object that supports a plurality of protocols enabling communication between the client and the server, said first communications object being protocol agnostic;

passing a uniform resource identifier (URI) from the client application to the first communications object, said URI identifying the server application with which the client application desires to communicate;

identifying a desired application layer protocol based on the URI from the client application, said desired application layer protocol based one of the plurality of protocols supported by the first communications object;

instantiating a second communications object based on a different URI identifying another server application with which the client application desires to communicate, said second communications object being protocol specific and corresponding to the identified application layer protocol; and implementing, by the instantiated second communications object, the application layer protocol to establish a connection between the client application and the server application.

10. One or more computer-readable media having computer-executable components comprising:

a client application component, said client application component providing a uniform resource identifier (URI) identifying a server application component with which the client application component desires to communicate; and a communications object component that supports a plurality of protocols enabling communication between the client and server application components, said communications object component identifying one of the supported plurality of protocols as a desired application layer protocol based on the URI, said communications object component instantiating a communications object based on the desired application layer protocol, said communications object component implementing the application layer protocol based on the instantiated communications object to establish a connection between the client application component and a server application component, wherein communication between the client and server application components is enabled according to a protocol stack having at least the application layer protocol and the transport layer protocol and wherein the communications object component separates at least one of the client and server application components from the application layer and transport layer protocols.

11. The computer-readable media of claim 10, wherein the instantiated communications object specifies a desired transport layer protocol and wherein the communications object component implements the application layer over the transport layer protocol based on the instantiated communications object.

12. The computer-readable media of claim 10, further comprising a callback interface component created from the instantiated communications object, one or both of said client and server application components using the callback interface component to implement asynchronous events generated by the instantiated communications object.

13. The computer-readable media of claim 12, wherein the server application component uses the callback interface component to send a reply to a request received from the client application component.

14. The computer-readable media of claim 10, wherein the communications object component comprises a client object component for use by the client application component, said client application component using the client object component to send one or more requests to the server application component.

15. The computer-readable media of claim 14, wherein the request from the client application component is one or more of the following: notification, transaction, and query.

16. The computer-readable media of claim 10, wherein the instantiated communications object comprises a server object component for use by the server application component, said server application component using the server object component to receive one or more requests sent by the client application component.

17. The computer-readable media of claim 10, wherein the communications object component is a Component Object Model (COM) component.

18. One or more computer-readable media having computer-executable components comprising:
   a client application component, said client application component providing a uniform resource identifier (URI) identifying a server application component with which the client application component desires to communicate; and
   a communications object component that supports a plurality of protocols enabling communication between the client and server application components, said communication object component identifying one of the supported plurality of protocols as a desired application layer protocol based on the URI, said communications object component instantiating a communications object based on the desired application layer protocol, said communications object component implementing the application layer protocol based on the instantiated communications object to establish a connection between the client application component and a server application component, wherein the communications object is protocol agnostic, and wherein the instantiated communications object is protocol specific.

19. The computer-readable media of claim 10, wherein the application layer protocol is Hypertext Transfer Protocol (HTTP).

20. The computer-readable media of claim 10, wherein the application layer protocol is Generic Communications Framework Protocol (GCFP).

21. The computer-readable media of claim 10, wherein the transport layer implements a transmission control protocol/Internet protocol transport.

22. The computer-readable media of claim 10, wherein the transport layer is Universal Data Protocol (UDP).

23. A distributed processing system comprising:
   a client executing a client application;
   a server executing a server application with which the client application desires to communicate; and
   a computer-readable medium having computer-executable instructions for implementing a first communications object, said first communications object supporting a plurality of protocols to enable communication between the client and server applications, said first communications object identifying one of the supported plurality of protocols as a desired application layer protocol based on a uniform resource identifier (URI) identifying the server application, a second communications object being instantiated based on the desired application layer protocol to implement the desired application layer protocol to establish a connection between the client application and the server application, said instantiated second communications object specifies a desired transport layer protocol and said instantiated second communications object implements the application layer over the transport layer protocol, said instantiated second communications object comprising a server object for use by the server application, said server application using the server object to receive one or more requests sent by the client application.

24. The system of claim 23, wherein the computer-readable medium is associated with the client.

25. The system of claim 23, wherein the instantiated second communications object specifies a desired transport layer protocol and wherein the instantiated second communications object implements the application layer over the transport layer protocol.

26. The system of claim 25, wherein communication between the client and server is enabled according to a protocol stack having at least the application layer protocol and the transport layer protocol and wherein the first communications object separates at least one of the client and server applications from the application layer and transport layer protocols.

27. The system of claim 23, further comprising a computer-readable medium having computer-executable instructions for creating a callback interface from the instantiated second communications object and implementing, by one or both of the client and server applications, asynchronous events generated by the instantiated second communications object.

28. The system of claim 27, wherein the server application uses the callback interface to send a reply to a request received from the client application.

29. The system of claim 23, wherein the instantiated second communications object comprises a client object for use by the client application, said client application using the client object to send one or more requests to the server application.

30. The system of claim 29, wherein the request from the client application is one or more of the following: notification, transaction, and query.

31. The system of claim 23, wherein the first communications object is protocol agnostic, and wherein the second communications object is protocol specific.

32. The system of claim 23, wherein the second communications object establishes a single connection between the client application and the server application and further comprising a computer-readable medium having computer-executable instructions for multiplexing/demultiplexing requests from the client application.

33. The system of claim 23, another server application with which the client application desires to communicate, said second communications object being instantiated based on a different URI identifying the other server application.

34. A method of communicating between a first device and a second device via a communication component, said first device executing an application program, said method comprising:
   conveying, from the application program to the communication component associated with the first device, a uniform resource identifier (URI) for specifying a protocol and transport from a plurality of protocols and transports supported by the communication component; and
   receiving, by the application program from the communication component, identification of a transmitting interface for transmitting, by the application program to the second device, at least one message, said receiving identification of the transmitting interface comprising passing from the communication component to the application program a pointer associated with the transmitting interface.

35. The method of claim 34, wherein the message is a request message, further comprising identifying, by the application program to the communication component, a receiving interface for receiving, by the application program from the communication component, at least one reply message in response to the request message, said reply message for processing by the application program.

36. The method of claim 35, wherein identifying a receiving interface comprises passing from the application program to the communication component a pointer associated with the receiving interface.

37. The method of claim 34, wherein the message is unidirectional.

38. The method of claim 34, wherein the URI identifies the second device and/or an application executing on the second device.

39. The method of claim 34, wherein the message is a notification, a transaction, or a query.

40. The method of claim 34, wherein the first device is a computer and the second device is a hardware device.

41. The method of claim 40, wherein the hardware device is a computer-readable medium.

42. The method of claim 34, wherein the first device is a client and the second device is a server.

43. One or more computer-readable media having computer-executable instructions for performing the method of claim 34.

44. A method of communicating between a first device and a second device via a communication component, said first device executing an application program, said method comprising:
   conveying, from the application program to the communication component associated with the first device, a uniform resource identifier (URI) for specifying a protocol and transport from a plurality of protocols and transports supported by the communication component;
   determining a receiving interface for receiving based on the URI;
   identifying, by the application program to the communication component, the determined receiving interface for receiving, by the application program from the communication component, at least one request message, said communication component implementing the specified protocol and transport to receive the request message from the second device for processing by the first device; and
   receiving, by the application program from the communication component, identification of a transmitting interface for transmitting, by the application program to the second device, at least one reply message in response to the request message, said reply message for processing by the second device.

45. A method of communicating between a first device and a second device via a communication component associated with the first device, said method comprising:
   receiving, by the communication component from an application program executing on the first device, a uniform resource identifier (URI) for specifying a protocol and transport from a plurality of protocols and transports supported by the communication component;
   identifying an object based on the URI, said identified object corresponding to the specified protocol and transport;
   instantiating another object being accessible by the application program via a pointer associated therewith based on the identified object, said instantiated object being accessible by the application program for implementing the specified protocol and transport to transmit at least one message from the first device to the second device; and
   receiving, by the communication component from the application program, identification of a receiving interface for receiving, by the application program from the communication component, a second message in response to the first message, said second message for processing by the application program.

46. The method of claim 5, further comprising creating a callback interface from the instantiated second communications object and implementing, by one or both of the client and server applications, asynchronous events generated by the instantiated second communications object.

47. The method of claim 1, wherein the request from the client application is one or more of the following: notification, transaction, and query.

48. The computer-readable media of claim 18, wherein the instantiated communications object specifies a desired transport layer protocol and wherein the communications object component implements the application layer over the transport layer protocol based on the instantiated communications object.

49. The computer-readable media of claim 18, wherein the instantiated communications object component comprises a client object component for use by the client application component, said client application component using the client object component to send one or more requests to the server application component.

50. The computer-readable media of claim 18, wherein the instantiated communications object comprises a server object component for use by the server application component, said server application component using the server object component to receive one or more requests sent by the client application component.

* * * * *